United States Patent
Luce

(10) Patent No.: US 10,259,568 B2
(45) Date of Patent: Apr. 16, 2019

(54) NON-JAMMING SHRINK LATCH ASSEMBLY FOR RETRACTABLE AIRCRAFT LANDING GEAR

(71) Applicant: GOODRICH CORPORATION, Charlotte, NC (US)

(72) Inventor: William E. Luce, Colleyville, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 356 days.

(21) Appl. No.: 15/378,770

(22) Filed: Dec. 14, 2016

(65) Prior Publication Data

US 2018/0162522 A1 Jun. 14, 2018

(51) Int. Cl.
| | |
|---|---|
| B64C 25/18 | (2006.01) |
| B64C 25/26 | (2006.01) |
| B64C 25/22 | (2006.01) |
| G05G 5/06 | (2006.01) |
| B64C 25/20 | (2006.01) |
| F16H 21/44 | (2006.01) |

(52) U.S. Cl.
CPC .............. *B64C 25/22* (2013.01); *B64C 25/18* (2013.01); *B64C 25/20* (2013.01); *B64C 25/26* (2013.01); *G05G 5/06* (2013.01); *F16H 21/44* (2013.01)

(58) Field of Classification Search
CPC ......... B64C 25/22; B64C 25/18; B64C 25/20; B64C 25/26; B64C 2025/008
USPC ..................................................... 244/102 R
See application file for complete search history.

(56) References Cited

U.S. PATENT DOCUMENTS

| | | | | |
|---|---|---|---|---|
| 2,720,369 | A | 10/1955 | Detzer | |
| 2,937,541 | A * | 5/1960 | Barlow | E05C 3/24 244/102 R |
| 3,652,039 | A | 3/1972 | Lucien | |
| 5,269,481 | A * | 12/1993 | Derrien | B64C 25/18 244/102 A |
| 8,186,620 | B2 * | 5/2012 | Luce | B64C 25/14 244/102 R |
| 8,231,078 | B2 * | 7/2012 | Amberg | B64C 25/20 244/102 A |

(Continued)

FOREIGN PATENT DOCUMENTS

| | | |
|---|---|---|
| CN | 104477379 | 8/2016 |
| FR | 2983828 | 10/2014 |

(Continued)

OTHER PUBLICATIONS

European Patent Office, European Search Report dated Apr. 18, 2018 in Application No. 17205958.6-1010.

*Primary Examiner* — Marc Burgess
(74) *Attorney, Agent, or Firm* — Snell & Wilmer, L.L.P.

(57) ABSTRACT

A non-jamming shrink latch assembly for retractable aircraft landing gear is disclosed. The non-jamming shrink latch assembly may comprise a rod; a hook pivotally coupled to a first rod end of the rod; a lower link having a first lower link end and a second lower link end, wherein the first lower link end is pivotally coupled to the hook; and an upper link pivotally coupled to the second lower link end of the lower link. The hook may be configured to move from a locked position to an open position in response to receiving a mechanical load from the lower link. The hook may also be configured to move from the open position to the locked position in response to receiving a mechanical load from a roller.

20 Claims, 6 Drawing Sheets

(56) References Cited

U.S. PATENT DOCUMENTS

| | | | |
|---|---|---|---|
| 8,814,094 B2 | 8/2014 | Tran | |
| 8,820,679 B2 * | 9/2014 | Martinez | B64C 25/10 244/102 SL |
| 2015/0314860 A1 * | 11/2015 | Henrion | B64C 25/26 244/102 A |

FOREIGN PATENT DOCUMENTS

| | | |
|---|---|---|
| FR | 3036375 | 11/2016 |
| GB | 704080 | 2/1954 |
| GB | 776013 | 5/1957 |

* cited by examiner

NON-JAMMING SHRINK LATCH ASSEMBLY FOR RETRACTABLE AIRCRAFT LANDING GEAR

FIELD

The present disclosure relates generally to retractable aircraft landing gear, and more specifically, to a non-jamming shrink latch assembly for retractable aircraft landing gear.

BACKGROUND

Retractable landing gear for aircraft may typically include a shock strut having an upper end pivotally mounted to the frame of the aircraft about a retraction axis for pivotal displacement between a vertical, downwardly extending, landing and ground support position, and a horizontal retracted positon nested within a wheel well in a lower surface of the aircraft wing or fuselage. One approach to saving space in the wheel well is to use a shrinking (or retractable) landing gear configured to shorten the length of the landing gear before or during its retraction into the stowed position, and extend the length of the landing gear when in a deployed state or during landing. A shrink safety latch may be used as a safety feature to prevent the shock strut from unshrinking while in a shortened, retracted position inside the wheel well. However, in response to the shrink safety latch becoming engaged in the event of the shock strut unshrinking, the shrink safety latch may remain engaged during the full landing gear extension and until the aircraft touches the ground with sufficient force to relieve the load on the shrink safety latch, causing a reduced capability landing.

SUMMARY in various embodiments, a non-jamming shrink latch assembly is disclosed. The non-jamming shrink latch assembly may comprise a rod and a hook pivotally coupled to a first end of the rod. The hook may comprise an engagement surface having a trigger. The non-jamming shrink latch assembly may comprise a lower link having a first lower link end and a second lower link end. The first lower link end may be pivotally coupled to the hook. The non-jamming shrink latch assembly may also comprise an upper link pivotally coupled to the second lower link end of the lower link.

In various embodiments, the hook may be configured to move from a locked position to an open position in response to receiving a mechanical load from the lower link. In various embodiments, the hook may comprise a first hook stop configured to engage the rod and limit a rotation of the hook relative to the rod in response to the hook moving into the open position. In various embodiments, the hook may comprise a second hook stop configured to engage the lower link and move the lower link from alignment with the upper link in response to the hook moving into the locked position. The second hook stop is also configured to move the hook from the locked position to the open position in response to the lower link being substantially aligned with the upper link. In various embodiments, the non-jamming shrink latch assembly may also comprise a link stop coupled to the upper link and the lower link and configured to keep the upper link and the lower link in a substantially aligned position in response to the hook being in the open position. In various embodiments, the non-jamming shrink latch assembly may also comprise a link spring coupled at a first link spring end to the rod and at a second link spring end to the lower link. In various embodiments, the non-jamming shrink latch assembly may also comprise a hook spring coupled at a first hook spring end to the hook and at a second hook spring end to the rod. The hook spring may be configured to hold the hook in at least one of the open position or the locked position.

In various embodiments, a shrink shock strut assembly is disclosed. The shrink shock strut assembly may comprise a strut cylinder and a strut piston coupled to the strut cylinder. The shrink shock strut assembly may comprise a roller coupled to the strut piston. The shrink shock strut assembly may comprise a non-jamming shrink latch assembly. The non-jamming shrink latch assembly may comprise a rod having a first rod end axially opposite a second rod end. The second rod end may be pivotally coupled to the strut cylinder. The non-jamming shrink latch assembly may comprise a hook pivotally coupled to the first end of the rod. The hook may comprise an engagement surface configured to interface with the roller. The non-jamming shrink latch assembly may comprise a lower link having a first lower link end and a second lower link end. The first lower link end may be pivotally coupled to the hook. The non-jamming shrink latch assembly may also comprise an upper link pivotally coupled to the second lower link end of the lower link.

In various embodiments, the hook may be configured to move from a locked position to an open position in response to receiving a mechanical load from the lower link. In various embodiments, the hook may comprise a first hook stop configured to engage the rod and limit a rotation of the hook relative to the rod in response to the hook moving into the open position. In various embodiments, the hook may comprise a second hook stop configured to engage the lower link and move the lower link from alignment with the upper link in response to the hook moving into the locked position. The second hook stop may also be configured to move the hook from the locked position to the open position in response to the lower link being substantially aligned with the upper link. In various embodiments, the shrink shock strut assembly may also comprise a link stop coupled to the upper link and the lower link and configured to keep the upper link and the lower link in a substantially aligned position in response to the hook being in the open position. In various embodiments, the shrink shock strut assembly may also comprise a link spring coupled at a first link spring end to the rod and at a second link spring end to the lower link. In various embodiments, the shrink shock strut assembly may also comprise a hook spring coupled at a first hook spring end to the hook and at a second hook spring end to the rod. The hook spring may be configured to hold the hook in at least one of the open position or the locked position.

In various embodiments, a retractable landing gear is disclosed. The retractable landing gear may comprise a landing gear actuator and a shrink shock strut assembly. The shrink shock strut assembly may comprise a strut cylinder, a strut piston mounted for a reciprocating movement within the strut cylinder, and a roller coupled to the strut piston. The retractable landing gear may also comprise a transfer cylinder in fluid communication with the shrink shock strut assembly. The transfer cylinder may be configured to provide a hydraulic fluid to the strut cylinder to facilitate the reciprocating movement of the strut piston. The retractable landing gear may also comprise a non-jamming shrink latch assembly. The non-jamming shrink latch assembly may comprise a rod a first rod end axially opposite a second rod end. The second rod end may be pivotally coupled to the strut cylinder. The non-jamming shrink latch assembly may comprise a hook pivotally coupled to the first rod end of the rod. The hook may comprise an engagement surface configured to interface with the roller. The non-jamming shrink latch assembly may comprise a lower link having a first lower link end and a second lower link end. The first lower link end may be pivotally coupled to the hook. The non-jamming shrink latch assembly may also comprise an upper link pivotally coupled to the second lower link end of the lower link.

In various embodiments, the hook may be configured to move from a locked position to an open position in response to receiving a mechanical load from the lower link. In the open position, the hook may be configured to release the roller to allow the strut cylinder to extend to an unshrunk length during a deployment. In various embodiments, the hook may comprise a first hook stop configured to engage the rod and limit a rotation of the hook relative to the rod, and a second hook stop configured to engage the lower link and move the lower link from alignment with the upper link. The second hook stop may be configured to move the lower link from alignment with the upper link in response to the roller engaging the trigger of the hook. In various embodiments, the retractable landing gear may also comprise a link stop coupled to the upper link and the lower link and configured to keep the upper link and the lower link in a substantially aligned position in response to the roller not being in contact with the hook. In various embodiments, the retractable landing gear may also comprise a link spring coupled at a first link spring end to the rod and at a second link spring end to the lower link. In various embodiments, the retractable landing gear may also comprise a hook spring coupled at a first hook spring end to the hook and at a second hook spring end to the rod. The hook spring may be configured to hold the hook in at least one of the open position or the locked position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
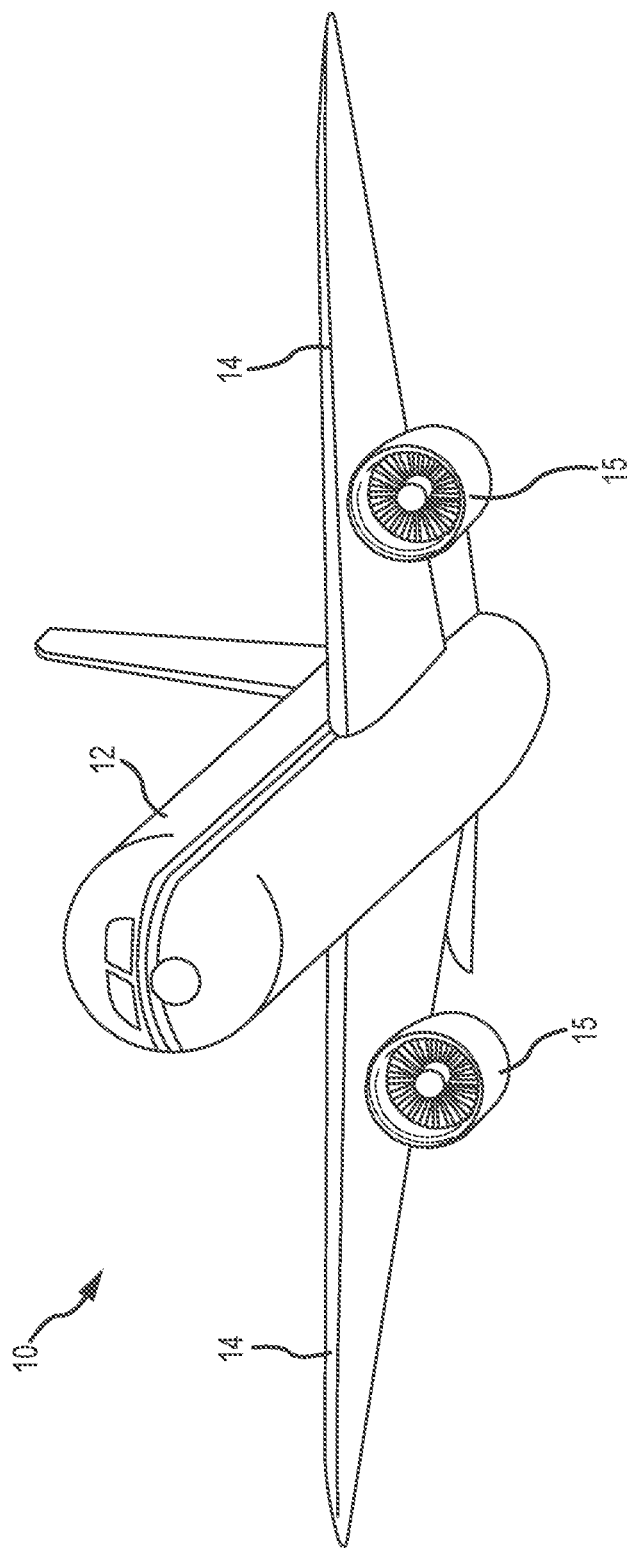
FIG. 1 illustrates a perspective view of an exemplary aircraft, in accordance with various embodiments.
Figure 2:
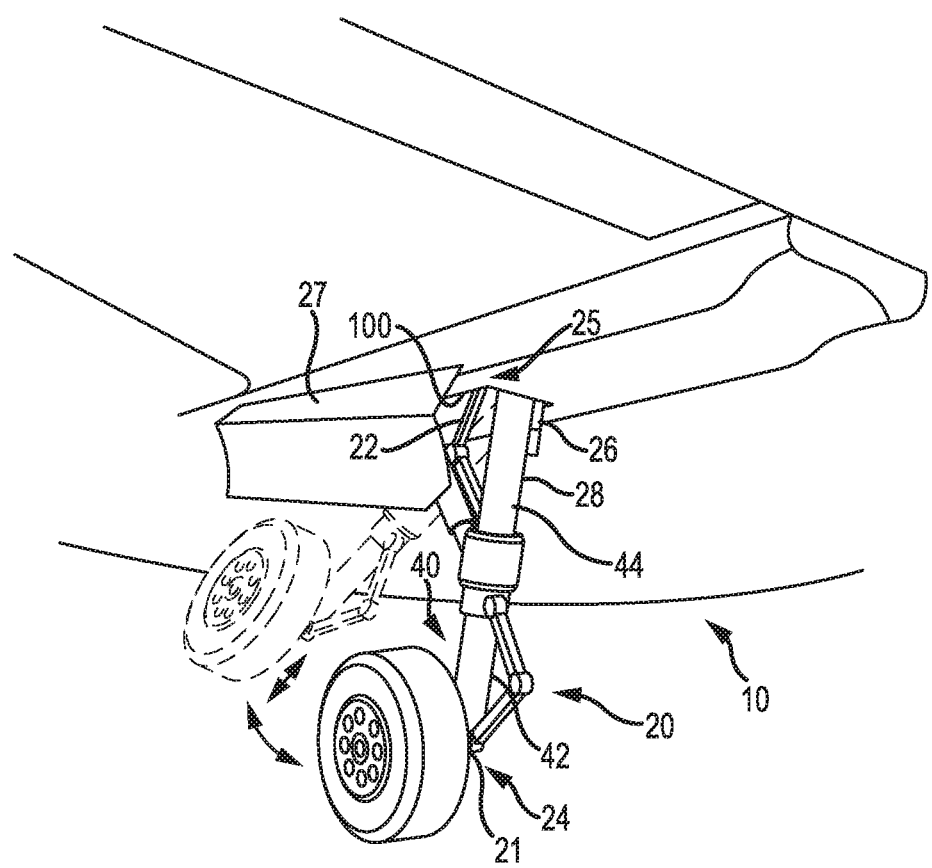
FIG. 2 illustrates a perspective view of the retractable landing gear employed on the aircraft of FIG. 1, in accordance with various embodiments.

In various embodiments, and with reference to FIG. 1, an aircraft 10 may comprise a fuselage 12. Fuselage 12 may be coupled to and/or comprise a pair of wings 14. One or more engines 15 may be coupled to the underside of wings 14. In various embodiments, aircraft 10 may also comprise deployable and/or retractable landing gear (e.g., as depicted in FIG. 2). The landing gear may also be shrinkable. The landing gear may be configured to extend to a deployed height (e.g., prior to landing) and shrink to a stowed height (e.g., after takeoff). The landing gear may be shrinkable to accommodate the storage envelope of an aircraft when the landing gear is stowed. In that regard, the landing gear may be capable of shrinking up to 40% of the available strut stroke or more, depending on configuration.

In various embodiments, and with reference to FIG. 2, aircraft 10 having a retractable landing gear 20 is depicted. Retractable landing gear 20 may include a shrink shock strut assembly 40 having an upper end pivotally mounted to the aircraft frame. In various embodiments, shrink shock strut assembly 40, which forms part of landing gear 20, may comprise an elongated tubular strut piston 42 that is coaxially mounted for a reciprocating movement within a strut cylinder 44. A landing gear actuator 22 may drive landing gear 20 and may be operatively associated with the upper portion of strut cylinder 44. A wheel assembly 24 of landing gear 20 is rotatably mounted to a lower portion of strut piston 42. Wheel assembly 24 may comprise any suitable components to aid in the mounting of a wheel for takeoff, landing, and general land operation of aircraft 10. In that respect, wheel assembly 24 may comprise a single wheel (as depicted in FIG. 2), or dual wheels or more. In various embodiments, wheel assembly 24 may also comprise an axle assembly 21. In various embodiments, and with brief reference to FIGS. 3A-3C, axle assembly 21 may also comprise a roller 55. Roller 55 may be configured to interface with a hook 120 of non-jamming shrink latch assembly 100, as described in greater detail below. Roller 55 may be located on an end of an inboard axle of axle assembly 21. For example, roller 55 may extend through a hubcap of axle assembly 21. Roller 55 may also be in any other suitable position on axle assembly 21. In various embodiments, roller 55 may also be coupled to a lower portion of strut piston 42.

In various embodiments, and with reference again to FIG. 2, strut cylinder 44 of shrink shock strut assembly 40 may be in fluid communication with a transfer cylinder 26 through a closed hydraulic circuit defined in part by an elongated tubular transfer conduit 28. Transfer cylinder 26, via transfer conduit 28, may deliver hydraulic fluid to strut cylinder 44 to reciprocate movement of strut piston 42 relative to strut cylinder 44 between a compressed or shrunk position (e.g., when inside wheel well 25) and a fully extended position. The hydraulic fluid for this closed circuit may be supplied from an aircraft's hydraulic supply, the hydraulic fluid being under pressure. The reciprocating movement between the compressed or shrunk position and the fully extended position may be effectuated by the transfer of a hydraulic fluid to and from transfer cylinder 26, via transfer conduit 28.

In various embodiments, the reciprocating movement of shrink shock strut assembly 40 may be controlled independent of landing gear actuator 22. For example, as landing gear 20 deploys from wheel well 25 (e.g., during landing), strut piston 42 may remain compressed within strut cylinder 44. After landing gear 20 is clear of wheel well 25 and the surrounding wheel well doors 27, strut piston 42 may be driven to the fully extended position by landing gear actuator 22.

Figure 3A:
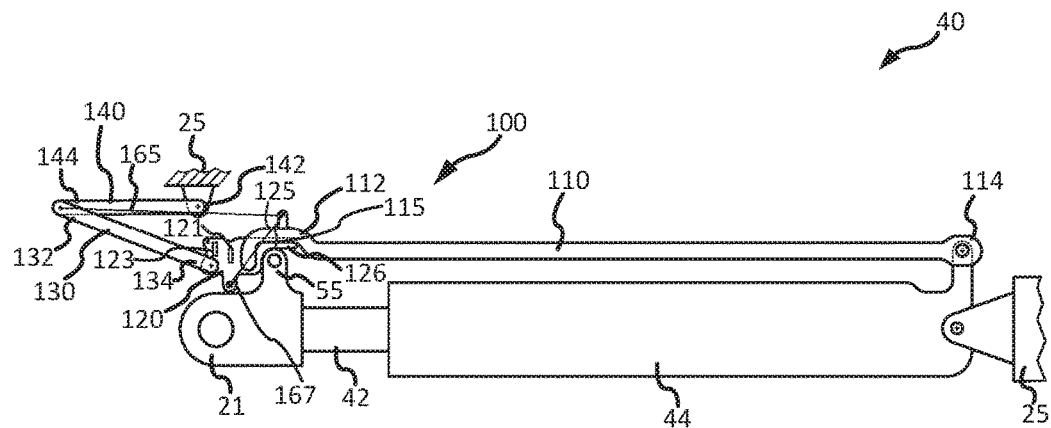
FIG. 3A illustrates a side view of a shrink shock strut assembly comprising a non-jamming shrink latch assembly in a locked position, in accordance with various embodiments.
Figure 3B:
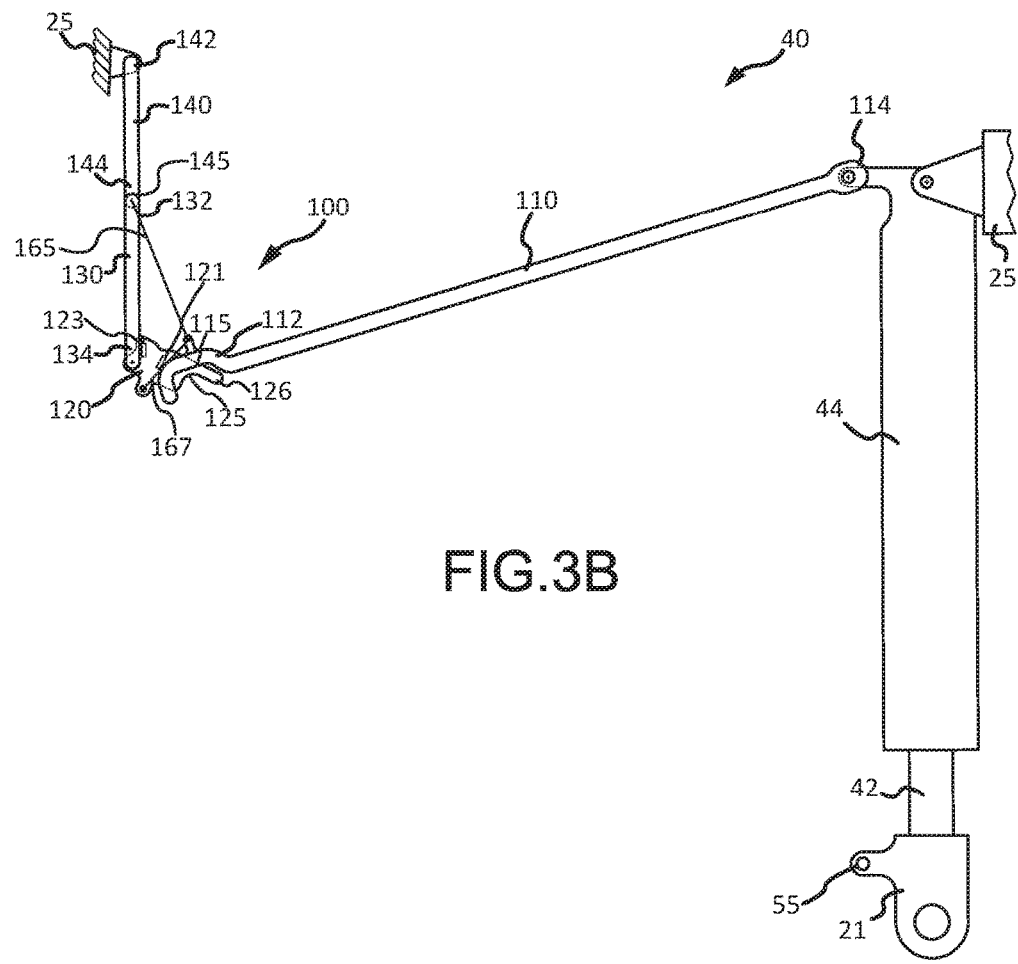
FIG. 3B illustrates a side view of a shrink shock strut assembly comprising a non-jamming shrink latch assembly in an open position, in accordance with various embodiments.
Figure 3C:
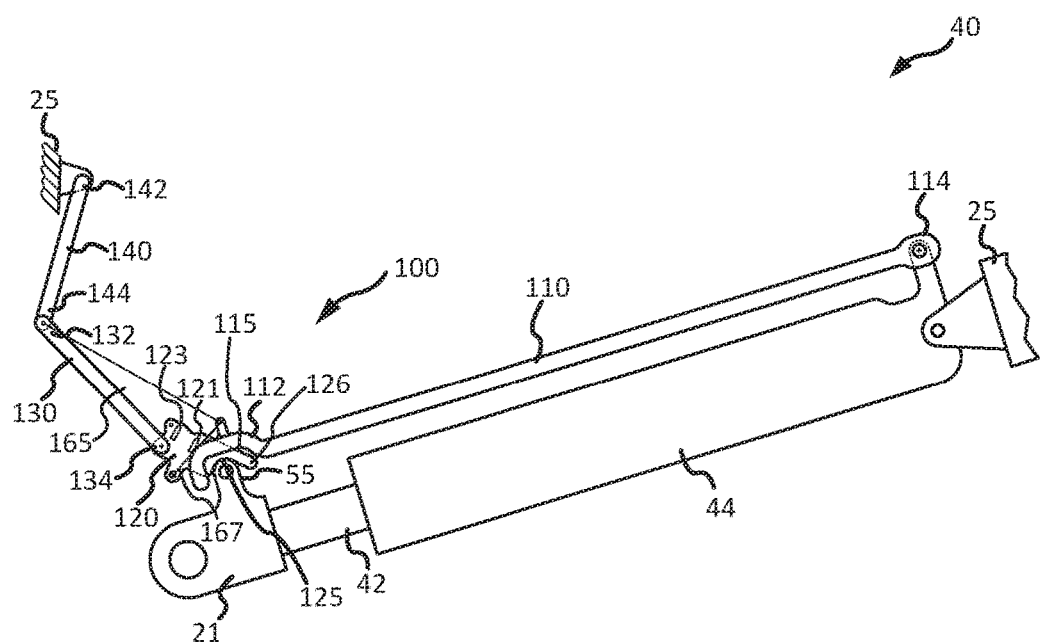
FIG. 3C illustrates a side view of a shrink shock strut assembly comprising a non-jamming shrink latch assembly moving from the locked position to an open position, in accordance with various embodiments.

In various embodiments, and with reference to FIGS. 3A, 3B, and 3C, shrink shock strut assembly 40 may also comprise a non-jamming shrink latch assembly 100. As discussed further below, non-jamming shrink latch assembly 100 may be configured to prevent axial movement of strut piston 42 into the fully extended position within wheel well 25. Non-jamming shrink latch assembly 100 may also enable strut piston 42 to reach full extension after leaving wheel well 25 without jamming and causing a reduced capability landing.

Figure 4:
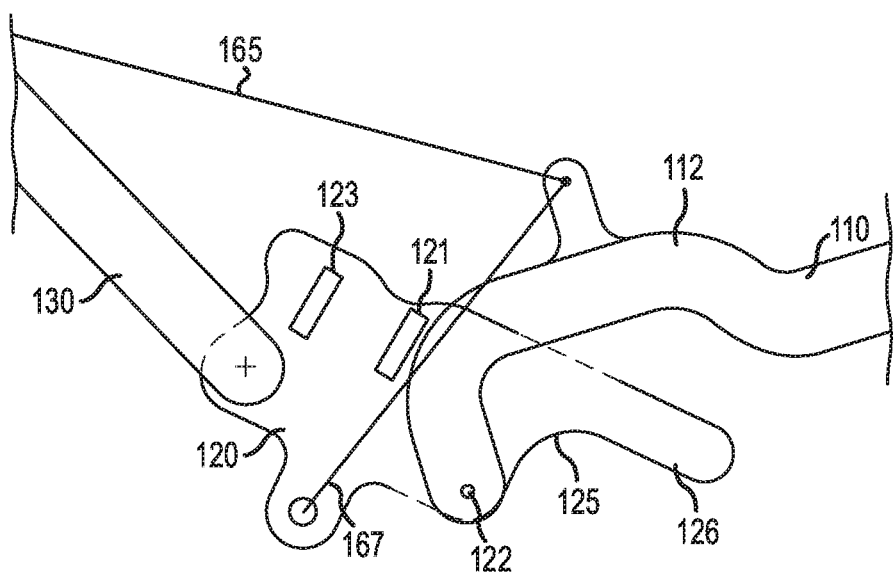
FIG. 4 illustrates a side view of a hook for the shrink shock strut assembly, in accordance with various embodiments.

In various embodiments, non-jamming shrink latch assembly 100 may comprise a rod 110. Rod 110 may comprise any suitable material, such as, for example, carbon fiber, and/or any other suitable metal or composite material, such as, for example, aluminum, steel, and/or the like. In various embodiments, rod 110 may comprise a first rod end 112 axially opposite a second rod end 114. Second rod end 114 may be pivotally coupled to an upper end of strut cylinder 44. Second rod end 114 may be coupled to strut cylinder 44 through a pivot joint, pin joint, and/or any other suitable joint allowing rotational movement. First rod end 112 may be pivotally coupled to a hook 120 (e.g., at a pivot point 122, as depicted in FIG. 4). In various embodiments, first rod end 112 may also comprise a biased surface 115 configured to provide additional clearance to hook 120 and roller 55.

In various embodiments, non-jamming shrink latch assembly 100 may comprise a lower link 130 and an upper link 140. Lower link 130 may comprise a first lower link end 134 opposite a second lower link end 132. Upper link 140 may comprise a first upper link end 142 opposite a second upper link end 144. First lower link end 134 may be pivotally coupled to hook 120. Second lower link end 132 may be pivotally coupled to second upper link end 144. First upper link end 142 may be pivotally coupled to the airframe within wheel well 25, and/or at any other suitable location on aircraft 10.

Figure 5A:
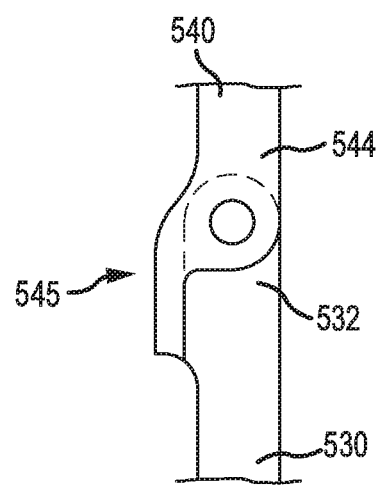
FIG. 5A illustrates a side view of a lower link and an upper link for the shrink shock strut assembly comprising a link stop, in accordance with various embodiments.
Figure 5B:
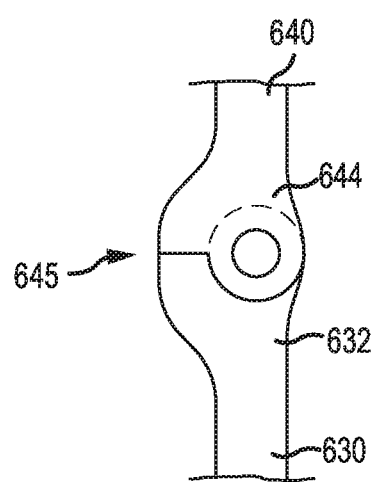
FIG. 5B illustrates a side view of the lower link and the upper link for the shrink shock strut assembly comprising a link stop, in accordance with various embodiments.

In various embodiments, and with reference to FIGS. 3B, 5A, and 5B, the coupling of upper link 140 and lower link 130 are depicted in greater detail. In that respect, upper link 140 and/or lower link 130 may comprise a link stop 145. Link stop 145 may comprise a raised surface on upper link 140 and/or lower link 130, and/or the like, configured to limit rotation of upper link 140 and lower link 130. For example, link stop 145 may limit rotation of upper link 140 and lower link 130 past a link alignment position or an over-center position. In that respect, link stop 145 may be located at the coupling of second lower link end 132 to second upper link end 144, and configured to limit rotation past the link alignment position wherein upper link 140 and lower link 130 are centrally aligned (and/or in an overcenter position). For example, and with brief reference to FIG. 5A, a link stop 545 may comprise an axially outer edge of a second upper link end 544, extending in a radial direction towards a lower link 530. Link stop 545 may extend over a second lower link end 532 to limit rotational movement of lower link 530 and upper link 540. As another example, and with brief reference to FIG. 5B, a link stop 645 may comprise an axially outer edge of both an upper link 640 and a lower link 630. In that respect, a second upper link end 644 and a second lower link end 632 may comprise a raised surface such that the axially outer edges of both second upper link end 644 and second lower link end 632 abut during rotation to limit rotational movement.

In various embodiments, and with reference again to FIGS. 3A-3C and 4, non-jamming shrink latch assembly 100 may comprise a hook 120 configured to interact with roller 55. In various embodiments, hook 120 may be configured to move from a locked position (e.g., as depicted in FIG. 3A) to an open position (e.g., as depicted in FIG. 3B). In various embodiments, hook 120 may comprise an engagement surface 125 configured to interface with roller 55. In that respect, in response to hook 120 being in the locked position, engagement surface 125 may engage roller 55 to prevent axial movement of strut piston 42 into the fully extended position. Engagement surface 125 may also comprises a trigger 126. Trigger 126 may be configured to contact roller 55 to disengage roller 55 from hook 120. For example, in response to hook 120 moving from the locked position into the open position, trigger 126 may push against roller 55 to disengage roller 55, and strut piston 42, from non-jamming shrink latch assembly 100. In response to hook 120 moving from the open position to the locked position (e.g., in response to receiving roller 55), roller 55 may contact trigger 126 to push lower link 130 and upper link 140 out of the aligned and/or overcenter position.

In various embodiments, hook 120 may comprise a first hook stop 121. First hook stop 121 may be configured to engage rod 110 and limit a rotation of hook 120 in an axial direction relative to rod 110 in response to hook 120 moving into the open position. In that regard, first hook stop 121 may comprise a raised surface on hook 120. For example, and as depicted in FIG. 3B, first hook stop 121 may abut first rod end 112 of rod 110 in response to hook 120 moving into the open position, causing hook 120 to stop rotation and stay in the open position.

In various embodiments, hook 120 may also comprise a second hook stop 123. Second hook stop 123 may be configured to engage lower link 130 and move lower link 130 from alignment with upper link 140, in response to hook 120 moving into the locked position. In that regard, second hook stop 123 may comprise a raised surface on hook 120. For example, and as depicted in FIG. 3B, second hook stop 123 may abut first lower link end 134 of lower link 130 in response to hook 120 moving from the open position to the locked position (and in response to roller 55 contacting trigger 126). As hook 120 continues to move into the locked position, second hook stop 123 may move lower link 130 from alignment with upper link 140 (as depicted in FIG. 3C). Moving lower link 130 from alignment with upper link 140 may enable non-jamming shrink latch assembly 100 to stow within wheel well 25 (as depicted in FIG. 3A, and with brief reference to FIG. 2).

In various embodiments, non-jamming shrink latch assembly 100 may also comprise a hook spring 167. Hook spring 167 may comprise any suitable object capable of providing tension, such as, for example, a coil spring, a tension spring, and/or the like. Hook spring 167 may be coupled at a first hook spring end to hook 120 and at a second hook spring end to first rod end 112 of rod 110. In various embodiments, hook spring 167 may be configured to aid in moving hook 120 from the open position into the locked position and/or from the locked position into the open position. In that respect, hook spring 167 may be configured to change bias depending on the position of hook 120, and may provide tension to hold hook 120 in the open position and/or the locked position. For example, in response to hook 120 being in the open position, hook spring 167 may aid in holding hook 120 biased in the open position (together with first hook stop 121 in contact with rod 110); in response to hook 120 being in the locked position, hook spring 167 may aid in holding hook 120 biased in the locked position (together with second hook stop 123 in contact with lower link 130); and in response to hook 120 being in an intermediate position between the open position and the closed position, hook spring 167 may provide no tension to hold hook 120 in either position.

In various embodiments, non-jamming shrink latch assembly 100 may also comprise a link spring 165. Link spring 165 may comprise any suitable object capable of providing tension, such as, for example, a coil spring, a tension spring, and/or the like. Link spring 165 may be coupled at a first link spring end to rod 110 and at a second link spring end to second lower link end 132 of lower link 130. In various embodiments, link spring 165 may be configured to provide tension on lower link 130 to pull lower link 130 into an aligned position and/or slightly overcenter position with upper link 140 e.g., as depicted in FIG. 3B), thus enabling hook 120 to remain in the open position.

In various embodiments, and during normal operating conditions, in response to aircraft 10 preparing to land, wheel well doors 27 may open and landing gear 20 may be rotatably deployed, as depicted in FIG. 2. Upon deployment of landing gear 20 from wheel well 25, strut piston 42 is allowed to axially decompress without the interference of non-jamming shrink latch assembly 100, allowing shrink shock strut assembly 40 to move to a fully extending condition for landing of aircraft 10.

In various embodiments, in the event of a mechanical or hydraulic failure condition within shrink shock strut assembly 40, transfer cylinder 26, transfer conduit 28, and/or other components of landing gear 20, non-jamming shrink latch assembly 100 may advantageously block or otherwise prevent axial movement of strut piston 42 into the fully extended condition within wheel well 25. In various embodiments, and with reference to FIG. 3A, hook 120 is depicted in the locked position. In that regard, as a result of the positive engagement of hook 120 with roller 55, via engagement surface 125, the failed and/or otherwise locked shrink shock strut assembly 40 may only be permitted to decompress or otherwise extend a short axial distance within wheel well 25 of aircraft 10 (with brief reference to FIG. 2).

In various embodiments, and with reference to FIG. 3C, during deployment of landing gear 20, non-jamming shrink latch assembly 100 may begin to move from the locked position to the open position to allow strut piston 42 to move into a fully extended position. In that respect, as shrink shock strut assembly 40 begins to deploy from wheel well 25, tension in upper link 140 and lower link 130 may increase as upper link 140 and lower link 130 are moved into an over center position by rod 110, via hook 120. The increase in tension in upper link 140 and lower link 130 may provide a mechanical load to hook 120. In response to receiving the mechanical load from lower link 130 (through upper link 140), hook 120 may move into the open position. In the open position, trigger 126 of engagement surface 125 may push against roller 55, causing roller 55 to move radially outward and disengage from engagement surface 125.

In various embodiments, and with brief reference to FIG. 3B, after disengagement from engagement surface 125, shrink shock strut assembly 40 may be permitted to extend into a full landing position. In that respect, shrink shock strut assembly 40 may extend to its fully extended (unshrunk) length without jamming on any adjacent structure and/or equipment in aircraft 10. For example, a radial length of upper link 140 together with lower link 130 may be configured such that the mechanical load from lower link 130 may not be provided to hook 120 (thus causing hook 120 to move into the open position) until shrink shock strut assembly 40 is clear of any adjacent structure and/or equipment in aircraft 10. Hook 120 may stay in the open position as shrink shock strut assembly 40 extends for landing of aircraft 10. In response to retraction of landing gear 20 into wheel well 25 (e.g., during flight), roller 55 may engage hook 120, causing hook 120 to move from the open position back into the closed position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and then legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A non-jamming shrink latch assembly, comprising:
   a rod having a fixed length;
   a hook pivotally coupled to a first rod end of the rod, wherein the hook comprises an engagement surface having a trigger;
   a lower link having a first lower link end and a second lower link end, wherein the first lower link end is pivotally coupled to the hook; and
   an upper link having a first upper link end and a second upper link end, wherein the first upper link end is pivotally coupled to a grounded position within a wheel well and the second upper link end is pivotally coupled to the second lower link end of the lower link,
   wherein the trigger is configured to engage a roller in an axle assembly, and wherein in response to the trigger engaging the roller, the hook is configured to engage the lower link to cause the lower link to rotate out of alignment with the upper link.

2. The non-jamming shrink latch assembly of claim 1, wherein the hook is configured to move from a locked position to an open position in response to receiving a mechanical load from the lower link.

3. The non-jamming shrink latch assembly of claim 2, wherein the hook comprises a first hook stop configured to engage the rod and limit a rotation of the hook relative to the rod in response to the hook moving into the open position.

4. The non-jamming shrink latch assembly of claim 2, wherein the hook comprises a second hook stop configured to engage the lower link and move the lower link from alignment with the upper link in response to the hook moving into the locked position, and wherein the second hook stop is configured to move the hook from the locked position to the open position in response to the lower link being substantially aligned with the upper ink.

5. The non-jamming shrink latch assembly of claim 2, further comprising a link stop coupled to at least one of the upper link and the lower link and configured to keep the upper link and the lower link in a substantially aligned position in response to the hook being in the open position.

6. The non-jamming shrink latch assembly of claim 2, further comprising a hook spring coupled at a first hook spring end to the hook and at a second hook spring end to the rod, wherein the hook spring is configured to hold the hook in at least one of the open position or the locked position.

7. The non-jamming shrink latch assembly of claim 1, further comprising a link spring coupled at a first link spring end to the rod and at a second link spring end to the lower link.

8. A shrink shock strut assembly, comprising:
   a strut cylinder pivotally coupled to a first grounded position within a wheel well;
   a strut piston coupled to the strut cylinder;
   a roller coupled to the strut piston; and
   a non-jamming shrink latch assembly, comprising:
     a rod having a first rod end axially opposite a second rod end, wherein the second rod end is pivotally coupled to the strut cylinder, and wherein the rod comprises a fixed length;
     a hook pivotally coupled to the first rod end of the rod, wherein the hook comprises an engagement surface having a trigger configured to interface with engage the roller;
     a lower link having a first lower link end and a second lower link end, wherein the first lower link end is pivotally coupled to the hook; and
     an upper link having a first upper link end and a second upper link end, wherein the first upper link end is pivotally coupled to a second grounded position within the wheel well and the second upper link end is pivotally coupled to the second lower link end of the lower link,
     wherein in response to the roller engaging the trigger, the hook is configured to engage the lower link to cause the lower link to rotate out of alignment with the upper link.

9. The shrink shock strut assembly of claim 8, wherein the hook is configured to move from a locked position to an open position in response to receiving a mechanical load from the lower link.

10. The shrink shock strut assembly of claim 9, wherein the hook comprises a first hook stop configured to engage the rod and limit a rotation of the hook relative to the rod in response to the hook moving into the open position.

11. The shrink shock strut assembly of claim 9, wherein the hook comprises a second hook stop configured to engage the lower link and move the lower link from alignment with the upper link in response to the hook moving into the locked position, and wherein the second hook stop is configured to move the hook from the locked position to the open position in response to the lower link being substantially aligned with the upper link.

12. The shrink shock strut assembly of claim 9, further comprising a link stop coupled to at least one of the upper link and the lower link and configured to keep the upper link and the lower link in a substantially aligned position in response to the hook being in the open position.

13. The shrink shock strut assembly of claim 9, further comprising a hook spring coupled at a first hook spring end to the hook and at a second hook spring end to the rod, wherein the hook spring is configured to hold the hook in at least one of the open position or the locked position.

14. The shrink shock strut assembly of claim 8, further comprising a link spring coupled at a first link spring end to the rod and at a second link spring end to the lower link.

15. A retractable landing gear, comprising:
a landing gear actuator;
a shrink shock strut assembly, comprising:
   a strut cylinder pivotally coupled to a first grounded position within a wheel well;
   a strut piston mounted for a reciprocating movement within the strut cylinder; and
   a roller coupled to the strut piston;
a transfer cylinder in fluid communication with the shrink shock strut assembly, wherein the transfer cylinder is configured to provide a hydraulic fluid to the strut cylinder to facilitate the reciprocating movement of the strut piston; and
a non-jamming shrink latch assembly, comprising:
   a rod having a first rod end axially opposite a second rod end, wherein the second rod end is pivotally coupled to the strut cylinder, and wherein the rod comprises a fixed length;
   a hook pivotally coupled to the first rod end of the rod, wherein the hook comprises an engagement surface and a trigger configured to interface with engage the roller;
   a lower link having a first lower link end and a second lower link end, wherein the first lower link end is pivotally coupled to the hook; and
   an upper link having a first upper link end and a second upper link end, wherein the first upper link end is pivotally coupled to a second grounded position within the wheel well and the second upper link end is pivotally coupled to the second lower link end of the lower link,
wherein in response to the roller engaging the trigger, the hook is configured to engage the lower link to cause the lower link to rotate out of alignment with the upper link.

16. The retractable landing gear of claim 15, wherein the hook is configured to move from a locked position to an open position in response to receiving a mechanical load from the lower link, wherein in the open position the hook is configured to release the roller to allow the strut cylinder to extend to an unshrunk length during a deployment.

17. The retractable landing gear of claim 16, wherein the hook comprises a first hook stop configured to engage the rod and limit a rotation of the hook relative to the rod, and a second hook stop configured to engage the lower link and move the lower link from alignment with the upper link in response to the roller engaging the trigger of the hook, and wherein the second hook stop is also configured to move the hook to the open position in response to the lower link and the upper link becoming substantially aligned as the roller is released from the hook.

18. The retractable landing gear of claim 16, further comprising a link stop coupled to at least one of the upper link and the lower link and configured to keep the upper link and the lower link in a substantially aligned position in response to the roller not being in contact with the hook.

19. The retractable landing gear of claim 16, further comprising a hook spring coupled at a first hook spring end to the hook and at a second hook spring end to the rod, wherein the hook spring is configured to hold the hook in at least one of the open position or the locked position.

20. The retractable landing gear of claim 15, further comprising a link spring coupled at a first link spring end to the rod and at a second link spring end to the lower link.

\* \* \* \* \*